Oct. 17, 1967 E. W. BABCOCK ET AL 3,347,655

GLASS SHEET SUPPORT FRAME

Filed July 10, 1964

INVENTORS
Eugene W. Babcock and
Richard A. Vascik
Nobbe & Swope
ATTORNEYS

United States Patent Office 3,347,655
Patented Oct. 17, 1967

3,347,655
GLASS SHEET SUPPORT FRAME
Eugene W. Babcock, Perrysburg, and Richard A. Vascik, Toledo, Ohio, assignors to Libbey-Owens-Ford Glass Company, Toledo, Ohio, a corporation of Ohio
Filed July 10, 1964, Ser. No. 381,787
5 Claims. (Cl. 65—375)

ABSTRACT OF THE DISCLOSURE

Apparatus for supporting glass sheets in a vertical position during tempering, comprising a frame, sheet support blocks formed of glass of substantially the same composition as the glass sheet for supporting the bottom edge of said sheet in glass-to-glass contact, and means engaging the upper edge of the sheet.

---

This invention relates broadly to apparatus for use in the tempering of glass and more particularly to an improved frame for supporting a glass sheet or plate during the heating and cooling operations.

A primary object of the invention is to provide an improved frame structure for supporting a glass sheet in such a way as to promote uniform heating and cooling and permit expansion and contraction thereof without danger of warpage and with a minimum amount of surface contact.

Another object of the invention is to provide in a frame structure of the above character means for uniformly supporting the bottom edge of the glass sheet at a plurality of spaced points and for maintaining the sheet in a horizontal plane.

Another object of the invention is to provide, in a frame structure of the above character, support means for the bottom edge of the glass sheet of a material having characteristics so similar to those of the glass as to minimize variations in the degree of cooling between the supported edge areas of the sheet and the major surface areas of the body thereof.

A further object of the invention is to provide a frame srtucture for a glass sheet to be easily and conveniently placed thereupon and removed therefrom and which is adapted to support sheets of different sizes.

Briefly state, these as well as other objects and advantages of the invention, which will become more apparent during the course of the following description when read in connection with the accompanying drawings, are made possible by the provision, in a sheet glass supporting frame, of special mounting means for the glass sheet which means includes a supporting foot, or supporting feet, that are also made of glass.

In the drawings wherein like numerals are employed to designate like parts throughout the same:

Figure 1:
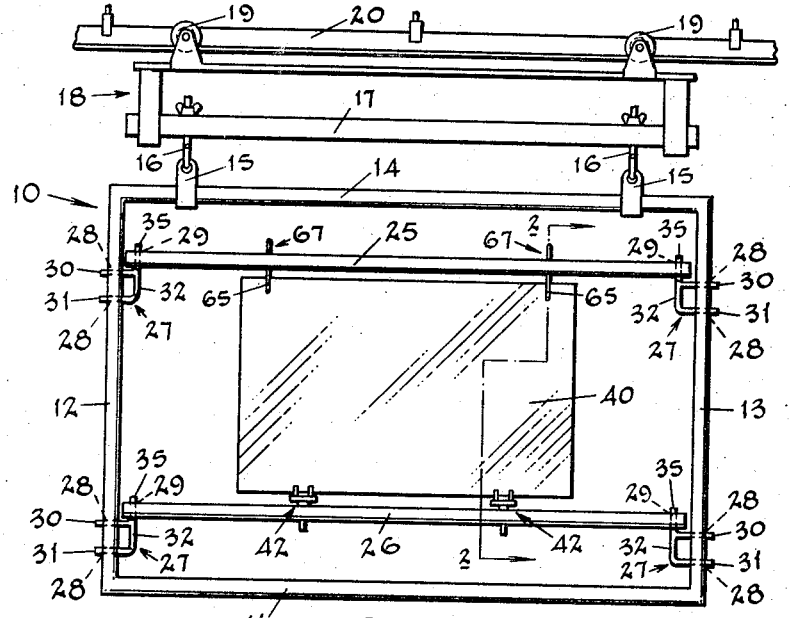
FIG. 1 is a front view of a frame constructed in accordance with the invention.

Referring now to the drawings and particularly to FIG. 1, the improved frame as therein shown is generally designated by the numeral 10 and comprises a bottom horizontal member or bar 11, vertical side members or bars 12 and 13 and a horizontal top member or bar 14; arranged in rectangular form and with the bottom, sides and top members being welded or otherwise suitably secured to one another at their adjacent ends. The several frame members may be made of relatively thin wall metal tubing or pipe to reduce weight of the frame generally.

The substantially rectangular frame 10 is adapted to be carried by vertical hangers 15 suitably secured at their lower ends to the top frame member 14. The upper ends of the hangers 15 are attached by hooks 16 to a horizontal bar 17 forming the lower element of a monorail carriage 18. As conventionally employed, the carriage 18 is equipped with caster wheels 19 adapted to traverse a track or rail 20 and thus convey the frame through suitable heating and cooling zones by which the desired treatment of the glass is carried out.

Although not herein shown, such heating and cooling zones conventionally include a heating furnace wherein a glass sheet is progressively heated to substantially its point of softening, and suitable opposed cooling devices, such as blast-heads, for simultaneously directing jets of air against the opposite surfaces of the heated sheet, to suddenly reduce the temperature of the glass and increase its mechanical strength. Such a strengthened glass is known as "tempered" glass and has its outer surface layers under compression and its interior portion in tension.

Additionally, the frame of this invention can be used to advantage in the supporting of glass sheets which, after being heated to point above the strain temperature and before being cooled, are provided with a sprayed film layer on at least one of its surfaces.

The actual sheet support members of the frame are a pair of bars 25 and 26 that are removably and adjustably mounted in vertically, parallel spaced relation to one another on the vertical side frame bars 12 and 13 by means of brackets generally designated by the numeral 27. In this connection, the frame bars 12 and 13, and the bars 25 and 26, for reasons to be hereinafter more fully explained, are formed with a series of axially aligned openings or holes 28 and 29 respectively.

Figure 2:
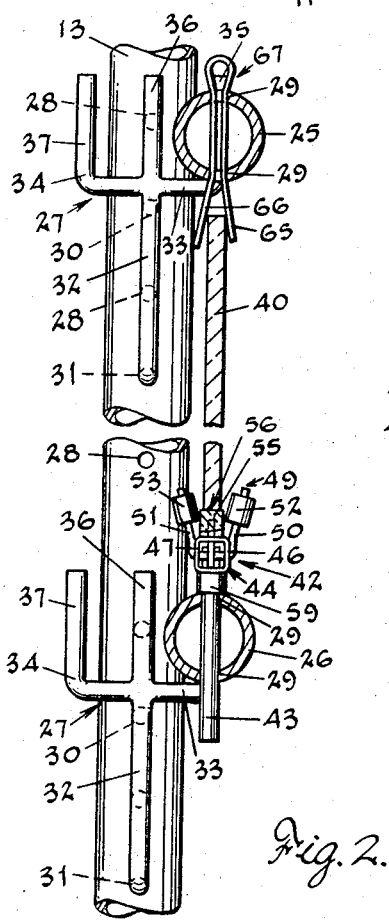
FIG. 2 is a transverse vertical section of the frame taken on line 2—2 of FIG. 1.

The support brackets 27, as seen in FIGS. 1 and 2, comprise a pair of vertically spaced horizontal rods or legs 30 and 31 integrally connected in common at one of their ends to a vertical rod or post 32. The rod or post 32, above the leg 30, supports L-shaped rods 33 and 34 to thereby form a trident of horizontally spaced, vertically disposed posts 35, 36 and 37 adapted to support the bars 25 and 26 in adjusted spaced, parallel relation. To this end, a pair of the support brackets 27 are mounted on each of the side frame members 12 and 13 by the insertion of the related legs 30 and 31 into selected holes 28 of the respective side members. The bars 25 and 26 are adapted to be located on any of the posts 35, 36 or 37 by receiving the same in registering holes 29 of said bars. This arrangement permits the bars to be located either in a common vertical plane with respect to one another or in a plane inclined to the vertical. Thus, as shown in FIG. 2, the bars 25 and 26 are located on the posts 35 of upper and lower aligned support brackets 27 to support a glass sheet in a substantially vertical plane while by locating the upper bar 25 on one or the other of the oppositely disposed pairs of posts 36 or 37 of the upper brackets 27, the bars 25 and 26 will be adapted to support a glass sheet in at least one of two selectively arranged angular planes. Obviously, to support a glass sheet in reversely disposed angular planes, the lower bar 26 can be located on the respective posts 36 and 37 of the lower brackets 27.

With the bars 25 and 26 thus mounted on the frame 10 in the above-described manner, a glass sheet 40 is adapted, by this invention, to be placed therebetween and supported in such a way that, for the purposes of heating and cooling and/or interim filming, the opposed surfaces thereof are substantially completely exposed to the maximum effects of such treating operations.

Figure 3:
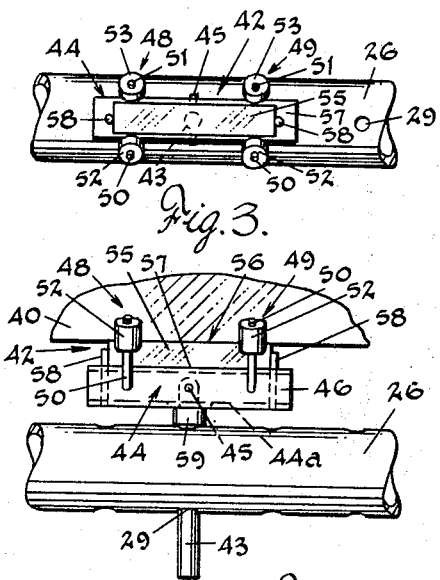
FIG. 3 is a plan view of the improved support member for the bottom edge of a glass sheet.

To this end, the lower bar 26 is provided with support members, generally designated by the numeral 42, which are adapted to freely support the lower edge of a glass sheet. Each member 42 is equipped with a downwardly directed post 43 adapted to be inserted in selected holes 29 of bar 26 according to the horizontal dimension of the glass sheet and the spacing between a pair of support members 42 required to locate the lower edge of the sheet in a horizontal plane. More particularly, as viewed in FIGS. 2, 3 and 4, each supporting member is formed with a square tubular metal body portion 44. The post 43 located in a slotted portion of the lower wall 44a is carried by a pin 45 passed through the opposed vertical walls 46 and 47 of the body portion of the support member medially between its ends. Spaced outwardly from the pin 45 are a pair of U-shaped rod elements 48 and 49 that are secured in the walls 46 and 47 and formed with upwardly and outwardly bent legs 50 and 51 on which are carried heat resistant, non-abrasive spacer rolls 52 and 53. These rolls are preferably of a ceramic or sillimanite material. Each transversely disposed pair of rolls is located in spaced relation to the opposed surfaces of a glass sheet and thus serve to prevent the same from lateral displacement from the supporting member. At the same time, the pairs of rolls are normally not in contact with the sheet surfaces.

An important, novel feature of this invention resides in the provision of a support block for the bottom edge of the sheet which block having at least a sheet contacting surface of a material having heat-absorbing and dissipating characteristics similar to if not identical with those of the glass to be treated.

Figure 4:
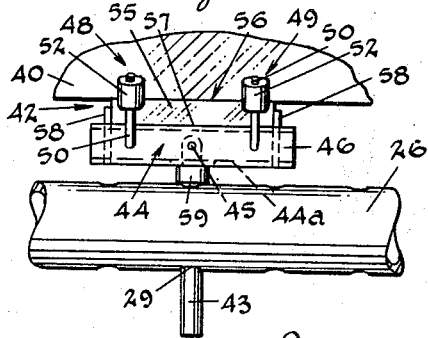
FIG. 4 is a side view of the support member of FIG. 3.

The provision of a support block or "foot member" 55 having at least one surface with these characteristics has considerable bearing on the heating and cooling of the immediate areas of the sheet on the blocks or foot members since unless the sheet and foot members are first uniformly heated and the heat of such supporting elements later rapidly dissipated, the affected areas, indicated at 56 in FIG. 4, will neither heat nor cool at the same rate as the major body portion of the glass sheet and will thereby eventually possess a degree of temper differing materially from the respective layers in compression and in tension developed in the sheet in its entirety.

According to this invention, however, the actual contacted portions of the lower edge of a mounted glass sheet are received on the foot members 55 which are preferably of substantially the same glass composition as the glass sheet itself. For example, with a sheet of conventional window or plate, which is soda-lime-silica glass, the foot members 55 would aso be of soda-lime-silica glass.

Each glass block or foot member 55 is carried on the upper wall 57 of the body portion 44 and removably located between the pairs of rolls 52 and 53. The foot member is also restrained from endwise movement by pins 58 secured in the body portion 44 and engaging the respective ends of the block.

The body portion 44 is spaced from and above the surface of the bar 26 by means of a fixed or loosely attached collar 59 on the post 43. Preferably, some "play" is permitted in order that, while the support member 42 per se is substantially rigidly mounted on the bar 26, by post 43 passed through holes 29 therein, the body portion 44 of the support member can pivot slightly on pin 45 in a vertical plane to freely orient itself to position the associated block or foot member in a common horizontal plane with the bottom edge of a glass sheet supported thereupon.

The upper marginal edge of the glass sheet, as in FIGS. 1 and 2, is adapted to be inserted between and supported by depending legs 65 and 66 of a U-shaped wire element 67 to maintain the sheet in a vertical position. Such elements are located in suitably spaced relation to the horizontal dimension of a glass sheet with the legs 65 and 66 being passed through holes 29 in the bar 25.

In use, the uppermost bar 25 is preferably located in spaced relation to the lower bar 26 by the adjusted positioning of the associated bracket 27 and at a slightly greater distance than the vertical dimension of a glass sheet to be supported therebetween. This permits the upper edge of a sheet to be inserted between the legs 65 and 66 of the elements 67 and then the sheet to be bodily lowered as the bottom edge thereof is passed over either of the rolls 52 or 53 and received on the glass foot members 55 of the spaced supporting members 42. Since the blocks 55 will become heated at the same rate as the body of the glass sheet and are not of a more slowly cooling or heat-retaining material, they will cool at the same rate as the glass sheet when it is subjected to blasts of cool air directed against its opposite surfaces. This is of prime importance in the production of tempered glass since, the supported areas could otherwise possess a differing degree of temper and thus become potential sources of weakness in the tempered sheet.

It is to be understood that the form of the invention herewith shown and described is to be taken as a preferred embodiment of the same, and that various changes in the shape, size and arrangement of parts may be resorted to without departing from the spirit of the invention.

We claim:

1. In a support frame for supporting a glass sheet in a vertical position during thermal treatment, means for supporting said sheet in said support frame including a block-like foot member positioned to contact an edge of said glass sheet, at least the sheet contacting surface of said foot member being of glass and having heat absorbing and dissipating properties substantially the same as those of the supported glass sheet and providing glass-to-glass contact therebetween, and means engaging an opposite edge of the glass sheet to maintain said sheet in a vertical position on said foot member.

2. In a support frame for supporting a glass sheet in a vertical position during thermal treatment, a sheet support member carried by said frame, a block-like foot member carried by said sheet support member for freely supporting the lower edge of the glass sheet, said foot member being formed of glass having heat absorbing and dissipating properties substantially the same as those of the glass sheet and providing glass-to-glass contact therebetween, retaining means carried by the sheet support member to prevent lateral displacement of the sheet from said foot member, and means engaging the upper edge of the sheet to maintain the sheet in a vertical position on said foot member.

3. In a support frame as claimed in claim 2, including means carried by the sheet support member for restricting endwise movement of the foot member relative thereto, and in which said retaining means comprises longitudinally and transversely spaced rollers of a ceramic material carried by the sheet support member and disposed at opposite sides of said sheet.

4. In a support frame as claimed in claim 3, in which said rollers engage the foot member but are normally spaced from the glass sheet.

5. In a support frame as claimed in claim 2, including a pair of spaced sheet support members and means for pivotally mounting each sheet support member on the support frame for swinging movement about a horizontal axis to locate the foot members in a common horizontal plane.

References Cited

UNITED STATES PATENTS 2,263,005   11/1941   McClure _____ 65—287

DONALL H. SYLVESTER, *Primary Examiner.*

A. D. KELLOGG, *Assistant Examiner.*